United States Patent
Braun et al.

(10) Patent No.: US 8,096,289 B2
(45) Date of Patent: Jan. 17, 2012

(54) APPARATUS AND METHOD FOR SEPARATING AIR COMPRESSOR SUPPLY PORT FROM THE EGR GAS

(75) Inventors: Jeffrey J. Braun, Columbus, IN (US); Robert E. Dehner, Columbus, IN (US)

(73) Assignee: Cummins Intellectual Properties, Inc., Minneapolis, MN (US)

(*) Notice: Subject to any disclaimer, the term of this patent is extended or adjusted under 35 U.S.C. 154(b) by 496 days.

(21) Appl. No.: 12/273,200

(22) Filed: Nov. 18, 2008

(65) Prior Publication Data

US 2010/0122693 A1    May 20, 2010

(51) Int. Cl.
F02M 25/07    (2006.01)

(52) U.S. Cl. .......... 123/568.11; 123/568.15; 123/568.17

(58) Field of Classification Search ............ 123/568.11, 123/568.17, 568.18, 585.59, 585, 590, 316, 123/568.15, 559.1; 60/605.1, 605.2; 701/108
See application file for complete search history.

(56) References Cited

U.S. PATENT DOCUMENTS

| | | | | |
|---|---|---|---|---|
| 1,768,854 | A | * | 7/1930 | Moore .................... 123/568.12 |
| 3,492,980 | A | * | 2/1970 | Beck ................... 60/278 |
| 3,829,281 | A | * | 8/1974 | Briggs et al. .................. 432/63 |
| 4,316,438 | A | * | 2/1982 | Iizuka ...................... 123/198 F |
| 4,509,465 | A | * | 4/1985 | Edelmann .................. 123/41.02 |
| 4,573,318 | A | * | 3/1986 | Entringer et al. ............... 60/310 |
| 4,831,822 | A | * | 5/1989 | Yoshimura ...................... 60/310 |
| 6,425,382 | B1 | | 7/2002 | Marthaler et al. |
| 6,763,654 | B2 | * | 7/2004 | Orlando et al. .............. 60/226.1 |
| 7,281,530 | B2 | * | 10/2007 | Usui .......................... 123/568.17 |
| 2004/0063364 | A1 | * | 4/2004 | Matsuda ..................... 440/89 R |
| 2007/0107708 | A1 | * | 5/2007 | Uchiyama et al. ........ 123/568.18 |

FOREIGN PATENT DOCUMENTS

| | | |
|---|---|---|
| EP | 1 580 421 B1 | 6/2008 |
| JP | 2003097279 A * | 4/2003 |
| JP | 2005-273557 A | 10/2005 |
| KR | 10-2006-0058334 A | 5/2006 |
| WO | 2007/130947 A1 | 11/2007 |

OTHER PUBLICATIONS

The International Search Report and The Written Opinion of the International Searching Authority with mailing date of Jun. 7, 2010; International Application No. PCT/US2009/064319.

* cited by examiner

*Primary Examiner* — Mahmoud Gimie
*Assistant Examiner* — David Hamaoui
(74) *Attorney, Agent, or Firm* — Studebaker & Brackett PC; Tim L. Brackett, Jr.

(57) ABSTRACT

Separation of an air compression supply port from exhaust gas recirculation (EGR) in internal combustion engines. In one aspect, an air intake connector includes an entry port for an EGR gas, and an air intake elbow is connected to the air intake connector, the elbow receiving air. The elbow includes a first passage for routing a first portion of the air to the air intake connector to be mixed with the EGR gas, and a second passage for routing a second portion of the air to the air intake connector and out an exit port to an air compressor. The second passage is attached to the elbow and extends through a bend in the elbow.

15 Claims, 6 Drawing Sheets

APPARATUS AND METHOD FOR SEPARATING AIR COMPRESSOR SUPPLY PORT FROM THE EGR GAS

FIELD OF THE INVENTION

The present invention relates to internal combustion engines, and more particularly to air compressor supply ports and exhaust gas recirculation (EGR) used in internal combustion engines.

BACKGROUND OF THE INVENTION

Exhaust gas recirculation (EGR) is used in internal combustion engines for reducing emissions in many gasoline and diesel engines. EGR recirculates a portion of an engine's exhaust gas back to the engine cylinders by intermixing incoming air with recirculated exhaust gas. This dilutes the mix with inert gas such that the exhaust gases displace some of the normal air intake. This lowers the peak combustion temperature in the cylinders, since exhaust gases have already combusted and do not burn again when recirculated. Nitrous oxide forms much faster at higher temperatures, and EGR thus limits the formation of nitrous oxide by slowing and cooling the combustion process.

Engines using EGR for emissions reduction may have some EGR exhaust gas products undesirably ingested into other components, such as an air compressor. Air compressors are often used in vehicle applications to compress air for use in pneumatic brakes, for example. Some of the EGR gas products can be ingested through the air compressor supply port that is provided in the same intake connection used for air that is mixed with the EGR gas. If a significant amount of EGR is ingested, it can cause reduced service life of the air compressor and related components.

To reduce the amount of EGR ingested by the air compressor, the entry to the air compressor supply port has sometimes been moved upstream, away from the entry port of the EGR gas, by extending a "hood" over the air compressor port in the direction away from the EGR gas entry. In some cases, a tube is inserted into the end of the hood to further extend the air supply port upstream. This tube extends into the air connection inlet elbow. However, the tube cannot be extended very far into the elbow before it limits the allowable rotation of the elbow. Rotation of the elbow is needed for flexibility in allowing different engine configurations of different manufacturers to be connected to the elbow; e.g., such different configurations may have components connecting to the elbow at different angles and orientations.

Furthermore, placing the air compressor supply port further upstream in the vehicle plumbing is discouraged due to the expense incurred by the vehicle manufacturer and the variability in the designs that may affect air compressor operation.

Accordingly, a system and method that allows full rotation of the inlet elbow and also allows for the air compressor inlet port to be moved further upstream from the EGR ports than allowed by previous designs would be desirable in many applications.

SUMMARY OF THE INVENTION

The invention of the present application relates to separation of an air compression supply port from exhaust gas recirculation (EGR) in internal combustion engines. In one aspect of the invention, an apparatus for separating an air compressor air intake in an internal combustion engine from an exhaust gas recirculation (EGR) gas includes an air intake connector including an entry port for an EGR gas. An air intake elbow is connected to the air intake connector, the elbow receiving air. The elbow includes a first passage for routing a first portion of the air to the air intake connector to be mixed with the EGR gas, and a second passage for routing a second portion of the air to the air intake connector and out an exit port of the air intake connector to an air compressor. The second passage is attached to the elbow and extends through a bend in the elbow. A similar aspect is provided for an engine system and a method for providing an air intake to an engine implementing similar features.

The present invention provides an apparatus and method for separating an air compressor supply port from EGR gases. The supply port can be located a distance away from EGR gas entry by providing a passage within and attached to the elbow to minimize the ingestion of EGR gas into an air compressor. The passage can be centered at its connection to an air intake connector to allow rotation of the elbow for a variety of different engine configurations.

DETAILED DESCRIPTION

The present invention relates to internal combustion engines, and more particularly to air compressor supply ports and exhaust gas recirculation (EGR) used in internal combustion engines. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular components provided in particular implementations. However, one of ordinary skill in the art will readily recognize that this apparatus will operate effectively in other implementations and applications. For example, the systems usable with the present invention can take a number of different forms.

To more particularly describe the features of the present invention, please refer to FIGS. 1-5C in conjunction with the discussion below.

Figure 1:
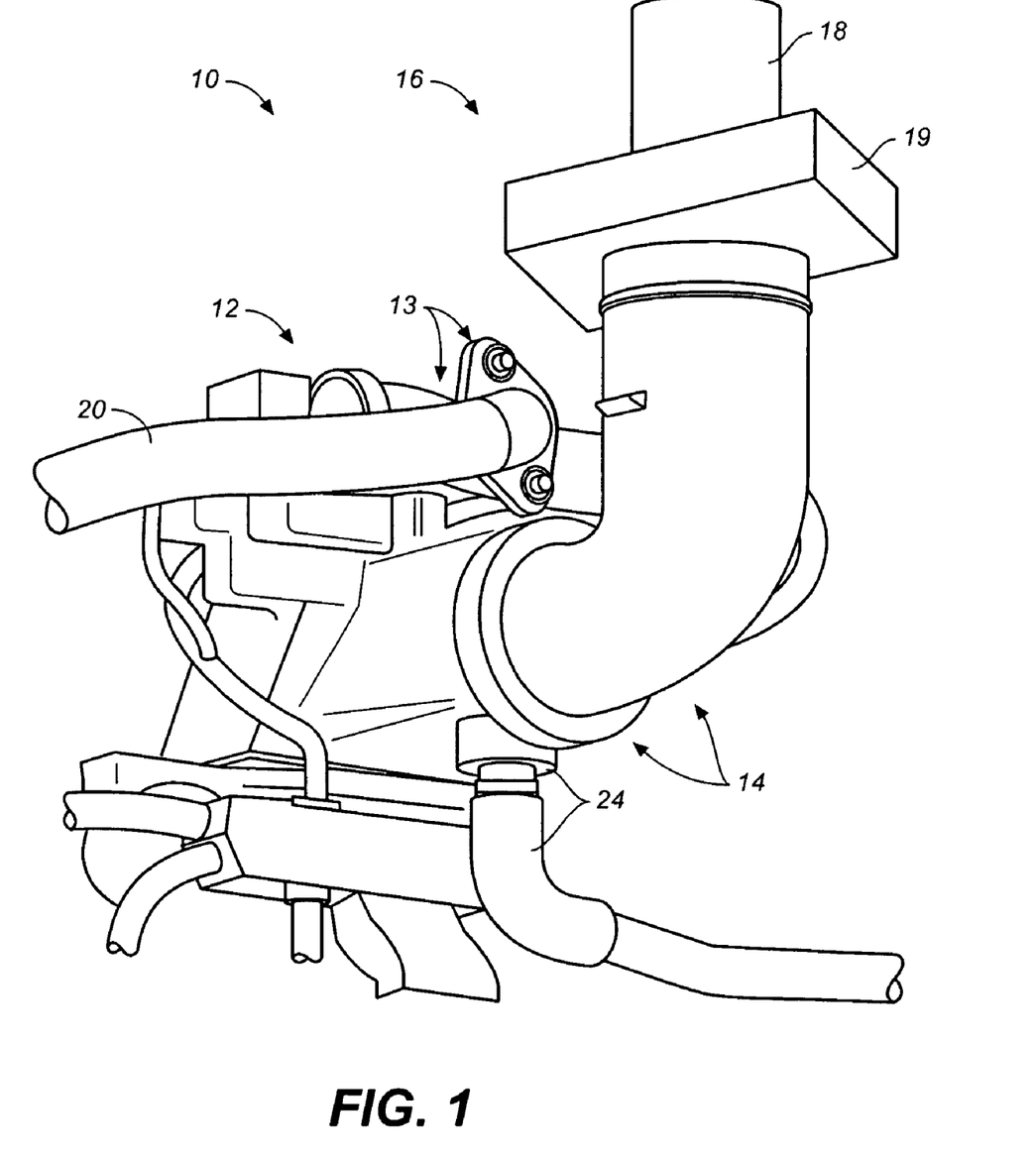
FIG. 1 is a perspective view of a portion of an engine assembly including an air intake assembly of the present invention.

FIG. 1 is a perspective view of a portion of an engine assembly 10 including an air intake assembly of the present invention. Engine assembly 10 includes an internal combustion engine 12, which can be of any of a variety of types of engine. For example, the internal combustion engine can be used in a variety of applications, including automotive, off highway, power generation and marine (boat or ship) applications. In one application, the engine can be a standardized diesel engine provided for use with a wide variety of different vehicles or other mechanisms.

An air intake assembly 14 receives air from an air intake system 16. For example, in one embodiment the air intake system 16 includes a turbocharger 18 receiving air from an external intake and/or an air filtration system, followed by a heat exchanger 19 that cools the air. The cooled air is provided to the air intake assembly 14. For example, the turbocharger 18 can be connected to an exhaust manifold of the internal combustion engine 12 and can convert waste energy from the exhaust manifold into compressed air which the turbocharger pushes into the heat exchanger 19, which cools that compressed air. This compression of the air to the engine allows the engine to produce more power and torque and improves the overall efficiency of the combustion process. Other embodiments can provide alternate components or systems to supply air to the air intake assembly 14.

The air intake assembly 14 routes the cooled air for use in mixing with EGR gas. EGR gas expelled from engine cylinders of engine 12 is input to an entry port in the assembly 14 using pipe 20 and with or without a valve assembly 13. This EGR gas is mixed with the portion of the air from the air intake system 16 that is provided through the air intake assembly 14, and the resulting mixture is provided to the engine for use in the cylinder combustion. The EGR gas portion of the mixture cools the combustion process and slows the formation of nitrous oxide in the combustion process.

Air intake assembly 14 also provides a different portion of the cooled air from the air intake system 16 to an air compressor 22 (see FIGS. 2A-2D) of the engine assembly 10. The air compressor 22 is connected to an exit port 24 of the air intake assembly 14. The air compressor functions to further compress the air and provides the additionally compressed air to a system connected to the engine 12, such as a pneumatic brake system. Other types of components and systems using compressed air from air compressor 22 can be used in alternate embodiments.

The portion of received air provided to the air compressor 22 is desired to be kept separate from and not mixed with the EGR gas as much as possible. The air intake assembly 14 of the present invention reduces the possibility of such a mixture.

Figure 2A:
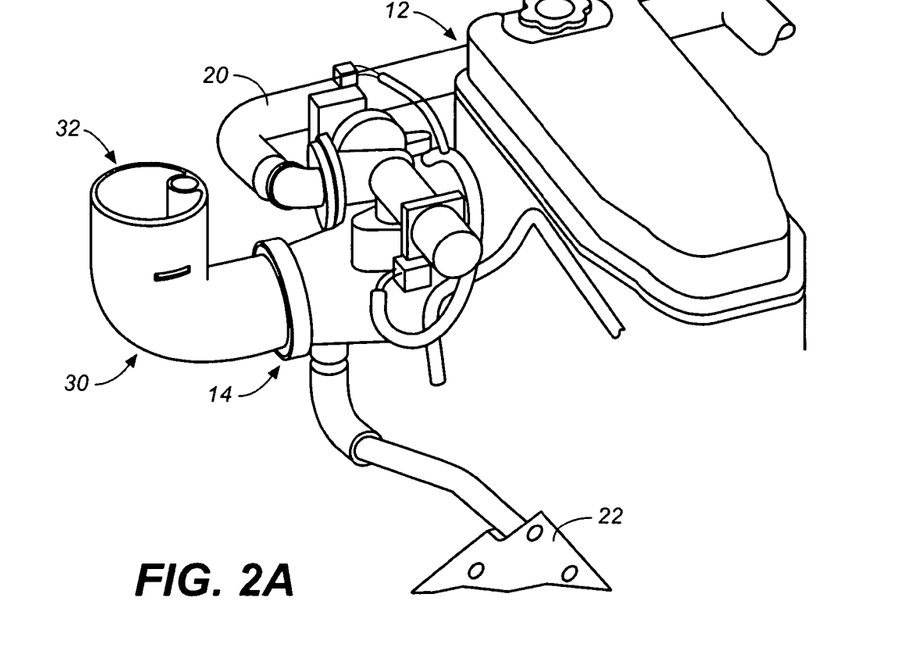
FIG. 2A through 2D are perspective views of the engine assembly of FIG. 1 showing different rotational positions of an air intake elbow.
Figure 2B:
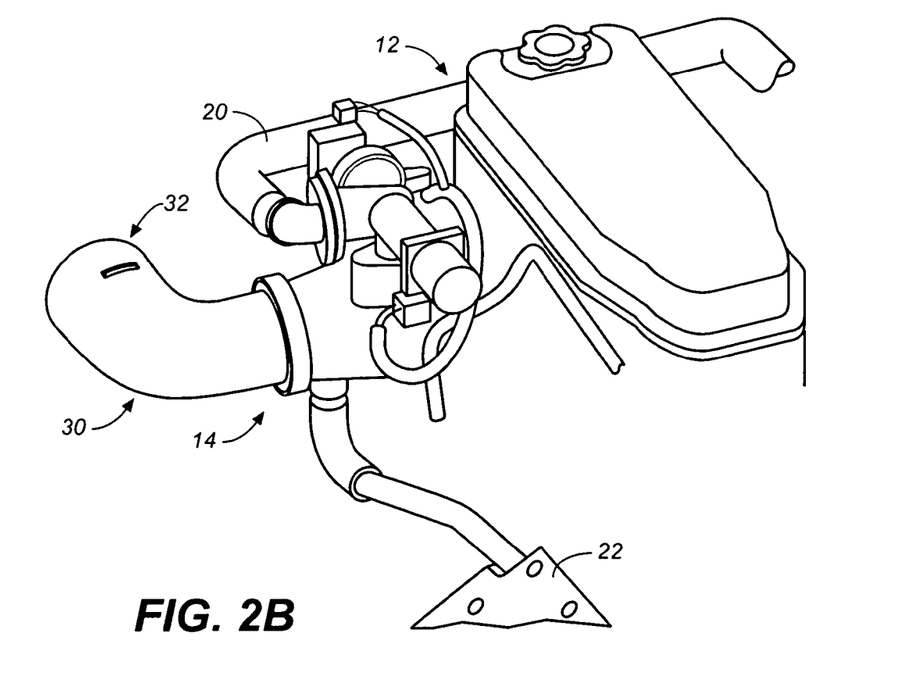
Figure 2C:
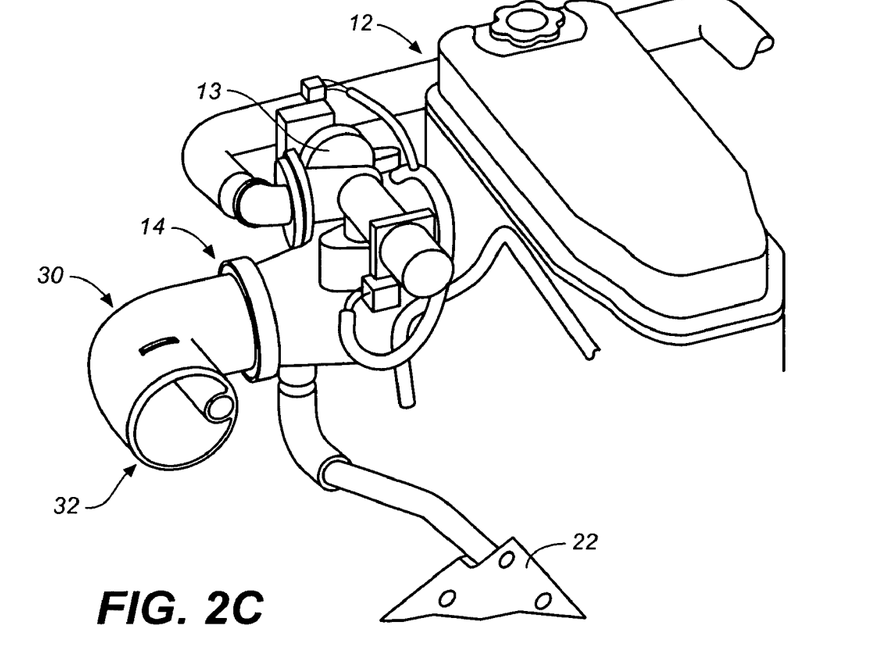
Figure 2D:
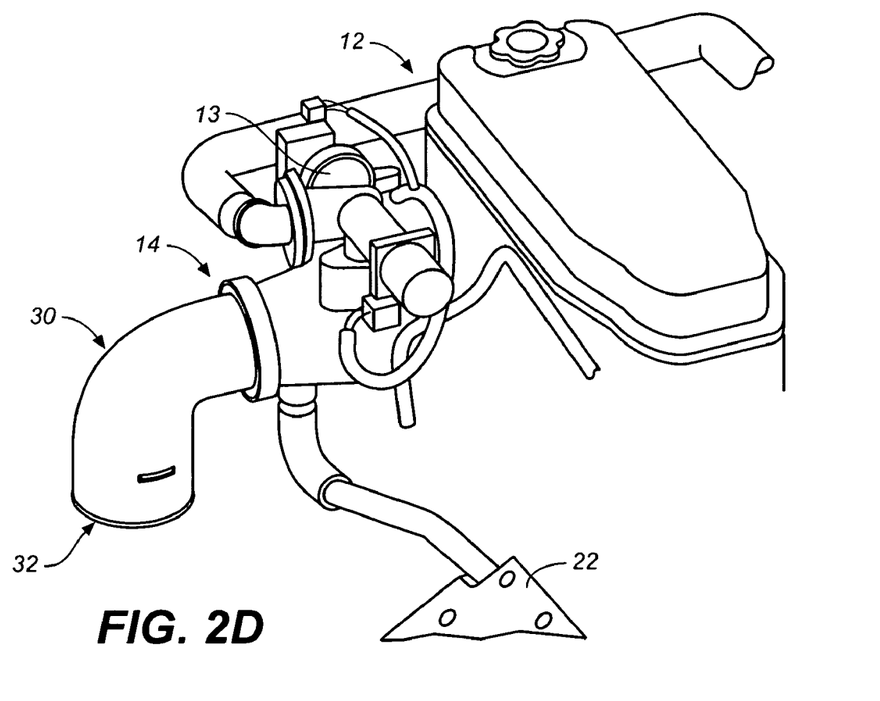

FIGS. 2A through 2D are perspective views of the engine assembly 10. The air intake assembly 14 of the present invention includes an air intake elbow 30 that can be rotated to different positions. Elbow 30 is shown as generally tubular with a circular cross-section, but may have a cross-section of a different shape in other embodiments. In FIG. 2A, elbow 30 is oriented such that the upstream end 32 of the elbow is pointed upward in the orientation of the Figures. In FIG. 2B, the elbow is oriented such that the upstream end 32 of the elbow is pointed 90 degrees in a counterclockwise direction with respect to the elbow 30 of FIG. 2A. In FIG. 2C, the elbow is oriented such that the upstream end 32 of the elbow is pointed 90 degrees to the side in a clockwise direction with respect to the elbow 30 of FIG. 2A. In FIG. 2D, the elbow is oriented such that the upstream end 32 of the elbow is pointed 180 degrees with respect to the elbow 30 of FIG. 2A. The elbow also may be positioned at any angle between those shown in FIGS. 2A through 2D, as desired.

The present invention thus allows the elbow 30 to be positioned at any desired angle with respect to the engine 12. This allows great flexibility in connecting an air intake system 16 to the elbow 30 to supply air to the upstream end 32 of the elbow 30. Different vehicles and other mechanisms may have an air intake system 16 that is positioned in any of a number of different angles or orientations with respect to the engine 12.

Figure 3A:
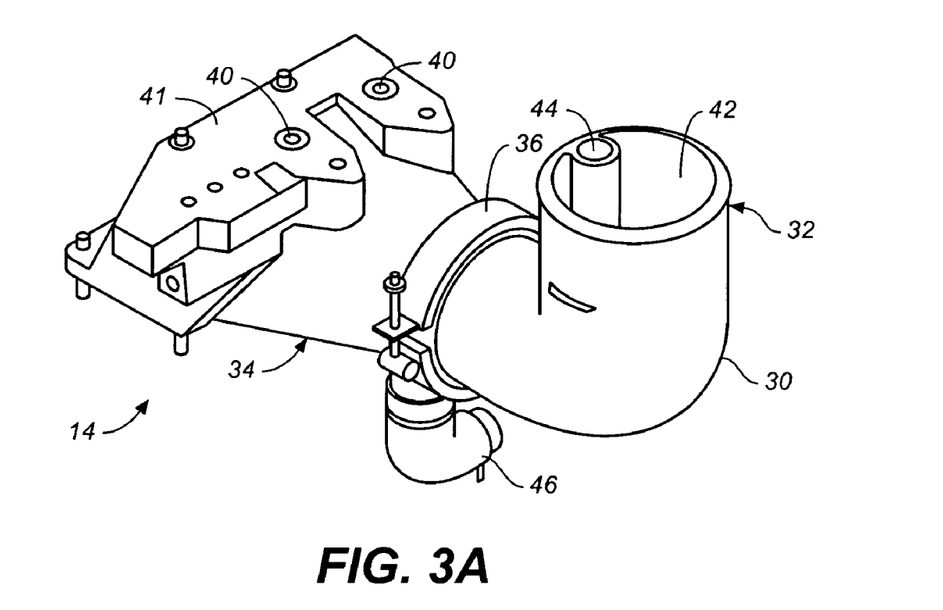
FIGS. 3A and 3B are perspective views of the air intake assembly of the present invention.
Figure 3B:
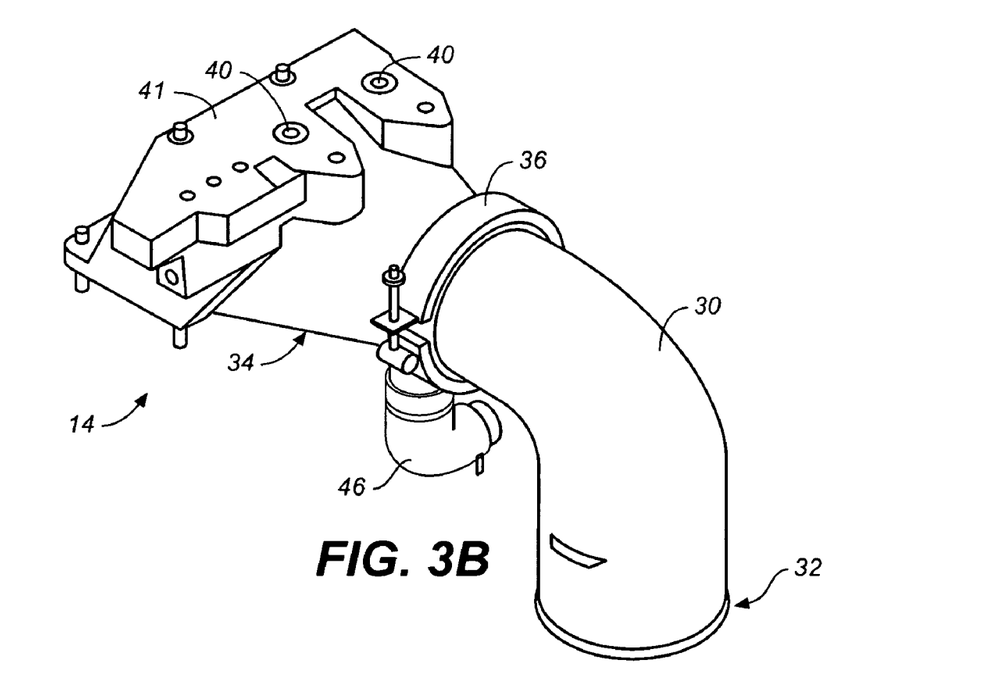

FIGS. 3A and 3B are perspective views of the air intake assembly 14, where FIG. 3A shows the elbow 30 such that the upstream end 32 of the elbow is in an upward direction as oriented in the Figures, and FIG. 3B shows the upstream end 32 of the elbow 30 in a downward direction. As shown, elbow 30 is connected to an air intake connection 34 by any suitable attachment mechanism, such as a collar 36 as shown. In other embodiments, the elbow 30 and connection 34 can be made as a single, unitary piece.

Entry port(s) (inlet(s)) 40 for the EGR gas are shown in an engine connection 41 of the air intake connection 34. Two inlets 40 are shown in FIGS. 3A and 3B, but any number from one to many can be used in other embodiments. The EGR gas is fed into a mixing chamber in the connection 34 via these inlets 40, to be mixed with air provided through the elbow 30. The air to be mixed with the EGR gas is provided through a first passage 42 in the elbow 30, while air to be fed to the air compressor is provided through second passage 44 in the elbow 30. The air through the second passage 44 is fed out the exit port outlet 46 from the air intake assembly 14.

Figure 4A:
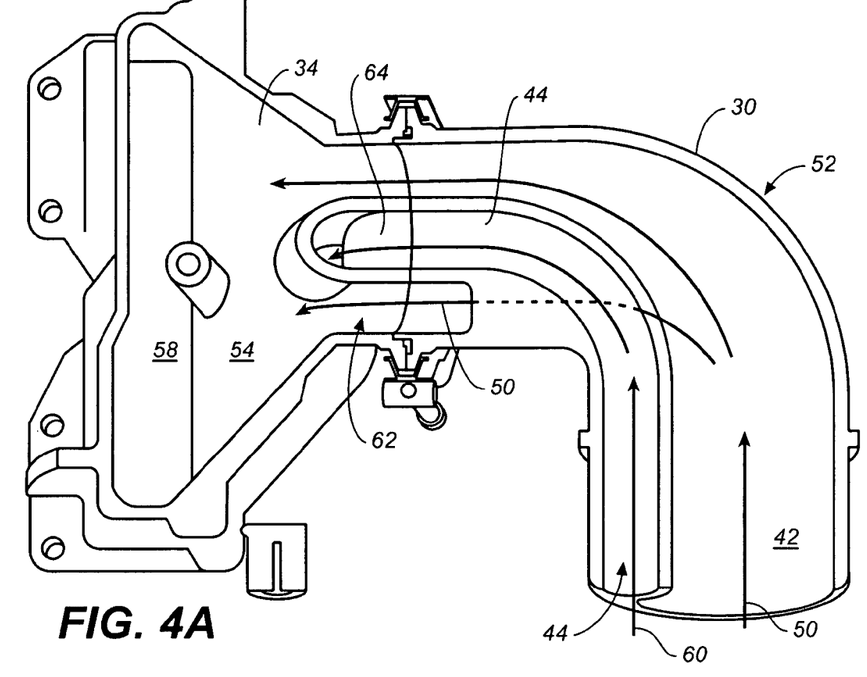
FIGS. 4A and 4B are perspective cross-sectional views of one embodiment of the air intake assembly of the present invention.
Figure 4B:
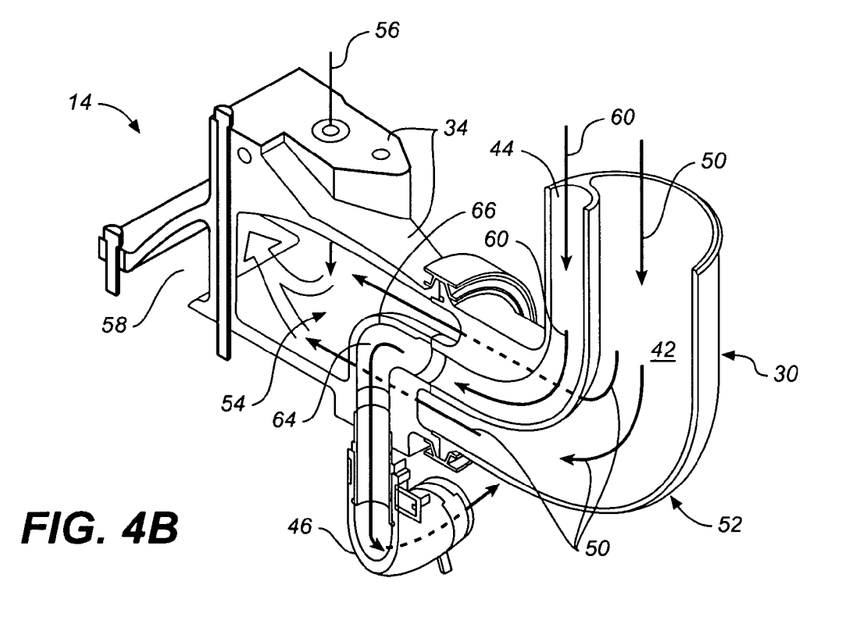
Figure 5A:
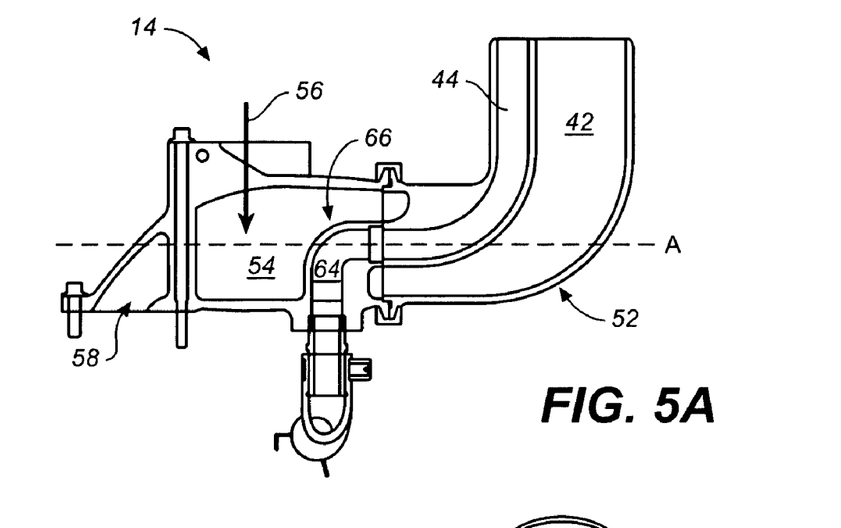
FIGS. 5A-5C are side elevational cross-sectional views of the air intake assembly with different rotational positions of the air intake elbow.
Figure 5B:
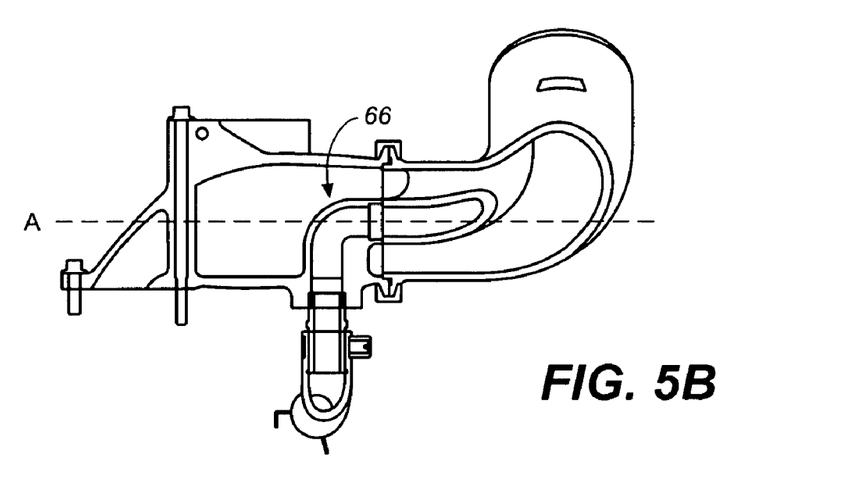
Figure 5C:
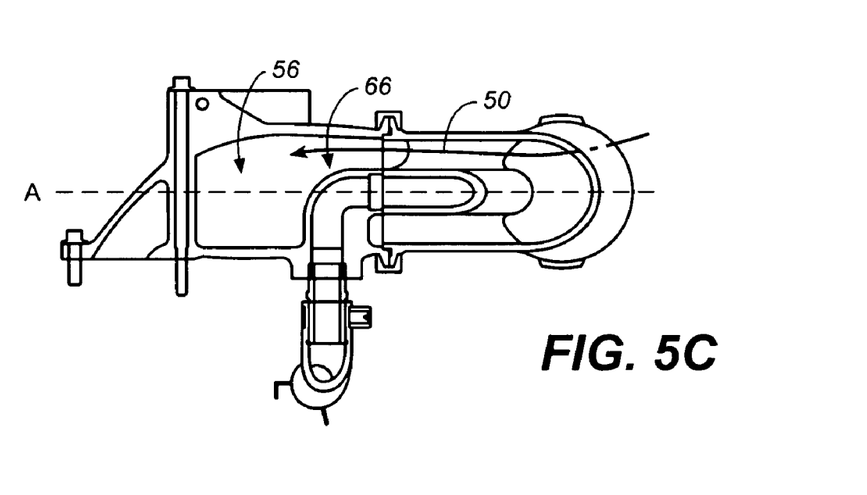

FIGS. 4A and 4B are perspective cross-sectional views of one embodiment of the air intake assembly 14 of the present invention. FIGS. 5A-5C are side elevational cross-sectional views of the air intake assembly 14 with different rotational positions of the elbow 30. As described above and shown in FIGS. 5A-5C, the elbow 30 may be positioned at any angle within the 360 degrees around an axis of rotation A, where axis A can be substantially parallel to the direction of airflow at the connection between air intake connector and elbow. The rotatable intake elbow 30 is attached to the air intake connection 34.

Elbow 30 includes a first passage 42 for routing a portion of the received air in the direction of arrows 50, such that the air is provided through the bend 52 in the elbow 30. The first passage 42 mates with a first passage 62 of the connection 34. Thus the portion of air is routed into the connection 34 in a mating connection, past the exit port outlet 46 and a bend in the second passage 44, and into a chamber 54 of the connection 34, where EGR gas is fed into as indicated by arrow 56. The EGR gas and that portion of air is mixed in the chamber 54 and is fed into the engine cylinders via an exit aperture 58 from the chamber 54. The gases can continue to be mixed as they flow together toward the engine cylinders.

Elbow 30 also includes second passage 44 for routing a different portion of the received air in the direction of arrows 60 to the air compressor 22. This portion of air is routed from the intake port at the upstream end 32 of the elbow 30, through the bend 52 in the elbow 30, through another bend 66 in the second passage 44, and out through the exit port 46 to the air compressor 22. In the described embodiment, the second passage 44 is implemented as a separate chamber molded or cast into the elbow material as a unitary piece. In the described embodiment, the bend 66 is located past the connection point between elbow 30 and connection 34, in the direction of airflow.

The passage 44 of the elbow 34 mates with an intake of a mating passage 64 of the connection 34. Thus both the elbow 30 and the connection 34 have an internal air passage for supply of air to the air compressor. The mating of these passages 44 and 64 is located at about the center of the first passage 42 of the elbow 30 and of the first passage 62 of the housing 34. This positioning allows the elbow 30 to be rotated to any position through 360 degrees around axis A while maintaining alignment of the two flow passages 44 and 64. The mating of the passages 44 and 64 can alternatively be located at about the center of the diameter or distance between of the outer surfaces of the elbow at the connection, in embodiments having an asymmetrical first passage 42/62 about axis of rotation A.

Other embodiments can include alternate features. For example, the elbow 30 can be made as long as is practical for a particular embodiment and/or have additional bends. The second passage 44 in the elbow 30 can be extended through most or all of the entire length of the elbow or truncated at any point along the intake elbow. The central port design of the present invention allows for four general positions of the air compressor supply inlet of passage 44: a) placed at or near the entry plane of the air intake connector 34; b) extended into the air inlet elbow with a passage that is not part of the inlet elbow 30; c) extended partially into the air inlet elbow as a passage attached to the air inlet elbow 30; d) extended completely to the end of the air inlet elbow and attached to the air inlet elbow (as shown in the Figures herein). A passage attached to the inlet elbow is preferred since it allows a greater extension upstream into the elbow and thus greater separation of compressor intake port and EGR gas entry port. The design allows for full 360 degree rotation of the air inlet elbow while providing the maximum possible separation of EGR products from the air compressor supply port. In addition, some benefit to mixing of the EGR gas and the fresh air may occur in some embodiments of air intake connections.

Also, the elbow 30 can be split into two or more pieces and assembled at desired rotational angles, rather than being cast as a single piece. For example, if the elbow 30 is two pieces joined at the bend 52, then additional orientations of the elbow can be configured.

Furthermore, in other embodiments the second passages 44 and/or 64 can be fabricated as a separate piece from the elbow 30 and/or connection 34, such as a nylon or plastic fabricated tube, and then attached to the elbow 30 or connection 34 at various locations along the length of the passages with a connection mechanism such as adhesive, welding connection, or attachment to support fins of the elbow 30 or connection 34, for example.

The air intake assembly 14 of the present invention has the advantage of allowing an air compressor supply port (the inlet to passage 44) to be located at or near the upstream end 32 of the elbow 30. This location is separated and extends through the bend in the elbow far upstream from the location of EGR gas entry into the air intake connection 34 and thus far from the mixing of air and EGR gas. This allows a portion of received air to be fed to the air compressor 22 while minimizing the ingestion of EGR gas into the air compressor, such that substantial isolation between EGR gas and air to the air compressor is achieved. The separation achieved can be the maximum possible within the envelope of the parts supplied with the engine.

Furthermore, the centered air compressor port inlet and the air passage 44 within the elbow 30 of the present invention permits the elbow 30 to be rotated to any angle and connected to a variety of different vehicle and engine configurations. Prior implementations did not allow a tube to be extended through the bend in the elbow 30 or very far into the elbow 30 since it would restrict elbow rotation. In the present invention, the inlet to the air compressor supply port is placed in the center of the air intake connection inlet, where it mates to the corresponding passage in the air inlet elbow. This design allows for full rotation of the air inlet elbow and for the air compressor supply port to be moved as far upstream as possible within the hardware supplied with the engine.

The centered air compressor port inlet also allows for a fixed location on the intake connection for attachment of the air compressor supply line 44, independent of the intake elbow 30 design or orientation, which minimizes the number of air compressor plumbing options. The invention also can avoid the requirement for a vehicle manufacturer to plumb the air compressor supply line into the charge air supply line to achieve separation of EGR gas from the air compressor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus to separate an air compressor air intake in an internal combustion engine from an exhaust gas recirculation (EGR) gas, the apparatus comprising:
    a connector adapted to receive intake air and including an exit port and an entry port for an EGR gas; and
    an air intake elbow connected to the air intake connector, the elbow adapted to receive intake air and including:
        a first passage adapted to route a first portion of the air to the air intake connector to be mixed with the EGR gas; and
        a second passage adapted to route a second portion of the air to the air intake connector and out said exit port of the air intake connector to an air compressor, wherein the second passage is attached to the elbow and extends through a bend in the elbow;
    wherein the air intake connector includes a connector passage that mates with the second passage at about the center of the first passage and mates with the exit port, wherein the connector passage substantially isolates the second portion of air from the EGR gas, the connector passage including a bend adapted to route the second portion of air to the exit port of the air intake connector.

2. The apparatus of claim 1 wherein the elbow is adjustable so as to be connected to the air intake connector at any of multiple available rotated positions about an axis of rotation.

3. The apparatus of claim 2 wherein the elbow is adjustable so as to be connected to the air intake connector at any of multiple rotated positions substantially 360 degrees about an axis of rotation that is substantially parallel to the direction of a flow of the second portion of air at the connection between the air intake connector and the elbow.

4. The apparatus of claim 1 wherein the second passage is cast as part of the elbow.

5. The apparatus of claim 1 wherein the second passage is fabricated separately from the elbow and later attached to the elbow.

6. The apparatus of claim 1 wherein the second passage extends from the air intake connector approximately to the upstream end of the elbow.

7. The apparatus of claim 1 wherein the air received by the elbow is compressed air provided by a turbocharger of the internal combustion engine.

8. An engine system comprising:
    an engine;
    a connector coupled to the engine to receive intake air and including an exit port and an entry port adapted to receive an exhaust gas recirculation (EGR) gas received from the engine; and an air compressor connected to said exit port;

an air intake elbow connected to the air intake connector, the elbow adapted to receive intake air and including:
  a first passage adapted to route a first portion of the air to the air intake connector to be mixed with the EGR gas and provided back to the engine; and
  a second passage adapted to route a second portion of the air to the air intake connector and out said exit port of the air intake connector to said air compressor, wherein the second passage is attached to the elbow and extends through a bend in the elbow.

9. The engine system of claim 1 wherein the elbow is adjustable so as to be connected to the air intake connector at any of multiple available rotated positions about an axis of rotation.

10. A method for providing an air intake in an internal combustion engine, the method comprising:
  providing an air intake connector including an entry port for an exhaust gas recirculation (EGR) gas; and
  routing received air through an air intake elbow connected to the air intake connector, including:
    routing a first portion of the air through a first passage of the elbow to the air intake connector to be mixed with the EGR gas; and
    routing a second portion of the air through a second passage of the elbow to the air intake connector and out an exit port of the air intake connector to an air compressor, wherein the second passage is attached to the elbow and extends through a bend in the elbow.

11. The method of claim 10 further comprising adjusting the elbow such that the elbow is connected to the air intake connector at any of multiple available rotated positions about an axis of rotation.

12. The method of claim 10 further comprising isolating the second portion of air from the EGR gas using a connector passage of the air intake connector, wherein the connector passage mates with the second passage at about the center of the first passage at a point of connection between the air intake connector and the elbow.

13. The method of claim 12 wherein the connector passage includes a bend that routes the second portion of air to the exit port of the air intake connector.

14. The method of claim 10 wherein the second passage extends from the air intake connector approximately to the upstream end of the elbow.

15. The method of claim 10 wherein the air received by the elbow is compressed air provided by a turbocharger of the internal combustion engine.

* * * * *